United States Patent [19]

Naarmann et al.

[11] Patent Number: 4,925,897

[45] Date of Patent: May 15, 1990

[54] MODIFIED POLYACETYLENE

[75] Inventors: Herbert Naarmann, Wattenheim; Gernot Koehler, Worms, both of Fed. Rep. of Germany

[73] Assignee: BASF Aktiengesellschaft, Ludwigshafen, Fed. Rep. of Germany

[21] Appl. No.: 295,395

[22] Filed: Jan. 10, 1989

[30] Foreign Application Priority Data

Jan. 12, 1988 [DE] Fed. Rep. of Germany ....... 3800578

[51] Int. Cl.$^5$ ................................................. C08F 8/30
[52] U.S. Cl. ..................................... 525/285; 525/288; 525/292; 525/328.1; 525/375
[58] Field of Search ............ 525/285, 288, 292, 328.1, 525/375

[56] References Cited

U.S. PATENT DOCUMENTS

| | | | |
|---|---|---|---|
| 3,519,611 | 7/1970 | Hay | 525/328.1 |
| 4,412,942 | 11/1983 | Naarmann et al. | 525/328.1 |
| 4,528,122 | 7/1985 | Murase et al. | 525/328.1 |
| 4,624,761 | 11/1986 | Lando | 525/328.1 |
| 4,640,960 | 2/1987 | Leyrer et al. | 525/328.1 |
| 4,672,093 | 6/1987 | Unek et al. | 525/328.1 |
| 4,705,645 | 11/1987 | Lee et al. | 525/328.1 |
| 4,753,998 | 6/1988 | Hayes et al. | 525/285 |

FOREIGN PATENT DOCUMENTS 7332581  10/1973  Japan .

OTHER PUBLICATIONS

M. Hatano Journal of Polymer Science, vol. 51, Issue 156 (1961) pp. 26–29.
G. Wegner, Z. Naturforschg. 24 pp. 824–832 [1969] Feb. 13, 1969.
L. B. Luttinger, Chemistry and Industry Sep. 3, 1960, p. 1135.
Takeo ITO, et al., Journal of Polymer Science: Polymer Chemistry Edition vol. 12, 11–20 (1974).
Hideki Shirakawa, et al., Polymer Journal, vol. 2, No. 2 pp. 231–244 (1971).
H. Naarmann, "Synthesis of New Conductive Polymers", Synthetic Metals, 17(1987) 223–228.

*Primary Examiner*—Bernard Lipman
*Attorney, Agent, or Firm*—Oblon, Spivak, McClelland, Maier & Neustadt

[57] ABSTRACT

Polyacetylene which is modified by reaction with a dienophilic compound, preparation of the said polyacetylene and its use for the production of moldings by processing by a thermoplastic method.

5 Claims, No Drawings

MODIFIED POLYACETYLENE

The present invention relates to polyacetylene.

Polyacetylene as such has long been known and is described in J. C. Chien, Polyacetylene, Academic Press, 1984, or in H. Naarmann, Synthetic Metals, 17 (1987), 223. It is generally prepared by polymerization of acetylene in the presence of Ziegler catalysts consisting of organoaluminum and organotitanium compounds or of organonickel or cobalt compounds at from about −100° to about +100° C. Such processes are described in, for example, (1) H. Shirakawa et al., JA 32581 (1973) J. Polym. Sci., Polymer Chem. 12 (1974), 11 Polym. J. 2/2 (1971), 231,
(2) F. Beck, Ber. der Bunsengesellschaft, 68 No. 6 (1964), 558,
(3) G. Wegner, Z. Naturforsch., 24b (1969), 824,
(4) L. B. Luttinger, Chem. and Ind., 3 Sept. (1960), 1135,
(5) W. Reppe et al., Ann. Chem., 560, 1, (1948), 104 and
(6) M. Hatano, J. Polym. Sci., 51 (1961), 26.

For the purposes of the present invention, polyacetylenes are polymers from the group consisting of the known mono-, di- and/or oligoalkynes.

In addition to, for example, propyne, butyne, pentyne, hexyne, heptyne, octyne, decyne and phenylacetylene, the monoalkynes include, in particular, acetylene itself. The monoalkynes may also be substituted and contain, for example, one or more C—C double bonds, for example 3-methylbut-3-en-1-yne, but-1-en-3-yne or the acetylenes substituted by phenylene derivatives. Examples of di- or polyalkynes are butadiyne, hexadiyne, octadiyne, diethynylbenzene, 1,3,5-triethynylbenzene or 1,2,4-triethynylbenzene. The di- or polyalkynes may likewise be substituted. The alkynes can be used alone or as a mixture with one another.

Acetylene is particularly preferably used as a monomer in the novel process. Monomer mixtures consisting of acetylene and other monoalkynes and/or di- and/or polyalkynes have also proven advantageous. These mixtures contain in general, in addition to acetylene, up to 50, preferably from 5 to 20, mol % of the other alkynes. A preferred monomer combination is a mixture of acetylene and 3-N-(phenalen-1'-on-9'-yl)-aminoprop-1-yne or (benzaldehyde-propargylamine)-azomethine, these mixtures advantageously containing from 10 to 90 mol % of acetylene. Monomer mixtures of acetylene and other comonomers, such as butadiene, are also suitable, the said mixtures containing from 1 to 10 mol % of the other comonomers.

Although known polyacetylene can be oriented by stretching, it has the decisive disadvantage that it cannot be processed by a thermoplastic method since, even under a protective gas, it cannot be heated to a temperature sufficiently high for it to soften or melt.

It is an object of the present invention to provide modified polyacetylene which can be processed by a thermoplastic method.

We have found that this object is achieved by polyacetylene which is modified by reaction with a dienophilic compound. Preferred embodiments of the invention are described in the subclaims.

We have also found a process for modifying polyacetylene and the use of the modified polyacetylene for the production of moldings by processing by a thermoplastic method.

Modification of the polyacetylene is understood as being the reaction or the conversion of some or all of the dienophilic compound with the polyacetylene.

For the purposes of the present invention, dienophilic compounds are substances capable of reacting with a diene in the Diels-Alder reaction (cf. for example L. F. Fieser and M. Fieser, Organische Chemie, Verlag Chemie, 1965, pages 238-245).

Examples of dienophilic compounds are maleic acid, maleimide, which may be substituted at the nitrogen by alkyl, cycloalkyl or aryl of not more than 12 carbon atoms, the corresponding maleamides, maleic anhydride, cinnamic aldehyde, cyclopentadiene, 1,3-cyclohexadiene, dichloro- and dibromomaleic acid and the corresponding maleamides. Good results are obtained with dibromomaleic anhydride, dichloromaleimide and dibromomaleimide. The parent imide structures are preferred; in addition, the nitrogen of the imides may furthermore be substituted by alkyl, cycloalkyl or aryl groups of not more than 12 carbon atoms. Good results are obtained if the dienophilic compound used is quinone, a halo- or dihaloquinone, halogen being chlorine or bromine, for example

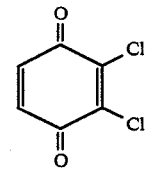

an aminoquinone I or a triazoline derivative II

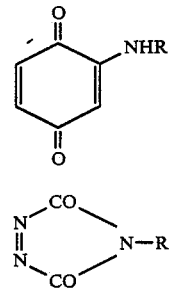

where R is an alkyl, cycloalkyl or aryl group of not more than 12 carbon atoms, which may in turn be substituted by NO$_2$, chlorine or bromine, or is, in particular, hydrogen. A particularly preferred compound is dichloromaleic anhydride.

The amounts in which the dienophilic compound is used in the modification of the polyacetylene depend on the desired result and can readily be determined by a few preliminary experiments. Experience to date has shown that good results are obtained if the weight ratio of dienophile to polyacetylene is from 1:2 to 2:1, in particular from 0.8:1 to 1:0.8.

In general, the modification is carried out in solvents which are usually used for the Diels-Alder reaction. Aromatic hydrocarbons, such as xylenes, cresols and in particular toluene are very suitable. The reaction temperatures can be varied within wide ranges, the reaction preferably being carried out at from 20° to 120° C. It has proven advantageous to carry out the reaction under inert conditions, ie under a protective gas, such as nitrogen or argon, essentially in the absence of oxygen, ie. with an oxygen concentration of less than 0.0001% by volume in the gas, in order substantially to avoid undesirable oxidation reactions. The reaction is generally complete after from 2 to 20 hours.

The modified polyacetylene according to the invention can be processed by a thermoplastic method, especially if the softening temperature of the modified polyacetylene is below 190° C. It can therefore be converted into moldings by, for example, extrusion or injection molding. Of course, processing by a thermoplastic method must be carried out under inert conditions, as described for the modification of the polyacetylene.

Before or after processing to moldings, the modified polyacetylene can be doped with known dopants in a conventional manner. The doping processes are described in the literature. In this connection, reference may be made to, in particular, EP-A-36 118. Iodine and arsenic pentafluoride have proven preferred dopants. In principle, however, it is possible to use all dopants mentioned in EP-A-36 118. Electrically conductive moldings can be obtained by this method.

EXAMPLE 1

Synthesis of polyacetylene

As described in the literature (1), the walls of a glass tube are wet, at −78° C., with active Ziegler catalyst comprising 15 ml of a 20% strength aluminum triethyl solution in toluene and 1.8 ml of titanium tetrabutylate. Thereafter, 500 ml (S.T.P.) of acetylene are allowed to react at −78° C. The Ziegler catalyst enclosed in the film is extracted with n-pentane; each extraction step takes 20 minutes. Subsequent drying of the film is carried out at −78° C. under a pressure down to $10^{-2}$ mbar.

Modification 10 g of the polyacetylene film in 1 kg of toluene are stirred with 10 g of dichloromaleic anhydride under argon for 6 hours at 110° C. The modified polyacetylene is then washed with fresh toluene. The product has a chlorine content of 1.7% by weight.

The modified polyacetylene has the following properties:

| Softening temperature measured under argon: | 180° C. |
| --- | --- |
| Electrical conductivity: | $3.5 \times 10^{-4}$ S/cm. |

The softening temperature is determined as follows: a sample of the modified polyacetylene is introduced into a test tube, and a thermometer is placed on the sample so that the thermometer can move freely.

After the tube has been heated to 100° C., heating is continued at a constant rate of 5° C. per minute, and the sample and thermometer are observed using a magnifying glass.

The softening temperature is taken as the temperature at which the thermometer cap begins to sink into the sample. The measurement is carried out under a protective gas.

The modified polyacetylene is doped as follows: The polyacetylene is doped for one hour in a saturated solution of iodine in carbon tetrachloride (2.65 g of iodine in 100 ml of carbon tetrachloride at 25° C.). It is then washed three times with carbon tetrachloride for 2 minutes in each case, after which it is dried in a stream of argon for 20 minutes and the pressure is then reduced to 0.1 bar for 1 hour at 30° C.

The electrical conductivity is then 180 S/cm.

EXAMPLE 2

The procedure described in Example 1 is followed, except that a polyethylene stretched to a degree of 550% is used.

The chlorine content of the product is 2.2% by weight, the softening point is 178° C. and the electrical conductivity is $2.1 \times 10^{-5}$ S/cm prior to doping and 2,500 S/cm after doping as in Example 1.

We claim:

1. A polyacetylene which is modified by a Diels-Alder reaction with a dienophilic compound selected from the group consisting of dichloromaleic anhydride; dibromomaleic anhydride; dichloromaleimide or dibromomaleimide, wherein the nitrogen may be substituted by alkyl, cycloalkyl or aryl groups of not more than 12 carbon atoms; quinone; a halo- or dihaloquinone, halogen being chlorine or bromine; an aminoquinone I or a triazoline derivative II

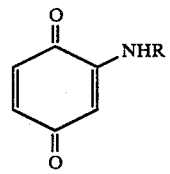   I

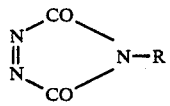   II where R is hydrogen or an alkyl, cycloalkyl or aryl group of not more than 12 carbon atoms, which may in turn be substituted by $NO_2$, chlorine or bromine; the reaction being conducted with a weight ratio of dienophile to polyacetylene of from 1:2 to 2:1, and at a temperature from 20° to 120° C.

2. A modified polyacetylene as claimed in claim 1, wherein the dienophilic compound used is dichloromaleic anhydride; dibromomaleic anhydride; dichloromaleimide or dibromomaleimide, wherein the nitrogen may be substituted by alkyl, cycloalkyl or aryl groups of not more than 12 carbon atoms.

3. A modified polyacetylene as claimed in claim 1, wherein the dienophilic compound used is quinone; a halo- or dihaloquinone, halogen being chlorine or bromine; an aminoquinone I or a triazoline derivative II

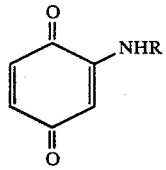   I

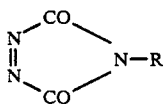   II where R is hydrogen or an alkyl, cycloalkyl or aryl group of not more than 12 carbon atoms, which may in turn be substituted by $NO_2$, chlorine or bromine.

4. A process for modifying polyacetylene, wherein polyacetylene is reacted in a Diels-Alder reaction with a dienophilic compound selected from the group consisting of dichloromaleic anhydride; dibromomaleic anhydride; dichloromaleimide or dibromomaleimide, wherein the nitrogen may be substituted by alkyl, cycloalkyl or aryl groups of not more than 12 carbon atoms; quinone; a halo- or dihaloquinone, halogen being chlorine or bromine; an aminoquinone I or a triazoline derivative II

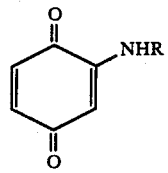

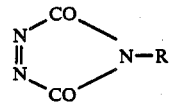

where R is hydrogen or an alkyl, cycloalkyl or aryl group of not more than 12 carbon atoms, which may in turn be substituted by $NO_2$, chlorine or bromine; the reaction being conducted with a weight ratio of dienophile to polyacetylene of from 1:2 to 2:1, and at a temperature from 20° to 120° C.

5. A method of using modified polyacetylene as claimed in claim 1 for the production of moldings by processing by a thermoplastic method.

* * * * *